United States Patent [19]

Bouillette et al.

[11] Patent Number: 4,853,245

[45] Date of Patent: Aug. 1, 1989

[54] RECONSTRUCTED FRUIT PIECES AND, PROCESS FOR PREPARATION

[75] Inventors: Thierry Bouillette, Orange; Denis Olivier, Les Taillades; Bernard Guigou, Apt, all of France

[73] Assignee: Etude Recherche Et Development - E.R.D. Sarl, Orange, France

[21] Appl. No.: 131,686

[22] Filed: Dec. 11, 1987

[30] Foreign Application Priority Data

Dec. 11, 1986 [FR] France ................................ 86 17463

[51] Int. Cl.$^4$ ............................................. A23L 1/064
[52] U.S. Cl. ...................................... 426/575; 426/573; 426/660
[58] Field of Search ................. 426/573, 574, 575, 660

[56] References Cited

U.S. PATENT DOCUMENTS

| | | | |
|---|---|---|---|
| 3,362,831 | 1/1968 | Szczesniak | 426/575 |
| 3,556,810 | 1/1971 | Moirano | 426/575 |
| 4,119,739 | 10/1978 | Borwick | 426/575 |
| 4,126,704 | 11/1978 | McCarthy et al. | 426/575 |
| 4,168,325 | 9/1979 | Gonzalez et al. | 426/575 |

FOREIGN PATENT DOCUMENTS 1271520 4/1902 France ................................ 426/575

*Primary Examiner*—Jeanette Hunter
*Attorney, Agent, or Firm*—Sughrue, Mion, Zinn, Macpeak & Seas

[57] ABSTRACT

A food product more particularly available as fruit pieces, of the kind containing a fruit concentrate and a gelation substance, has by weight composition approximately: 1–30% denaturated fruit alcohol, 15–50% fruit concentrate, 5–30% sugar, 0.5–3% alginate. A process for the manufacturing of the product and a static mixer for the implementation of the process of the invention is also involved.

9 Claims, 1 Drawing Sheet

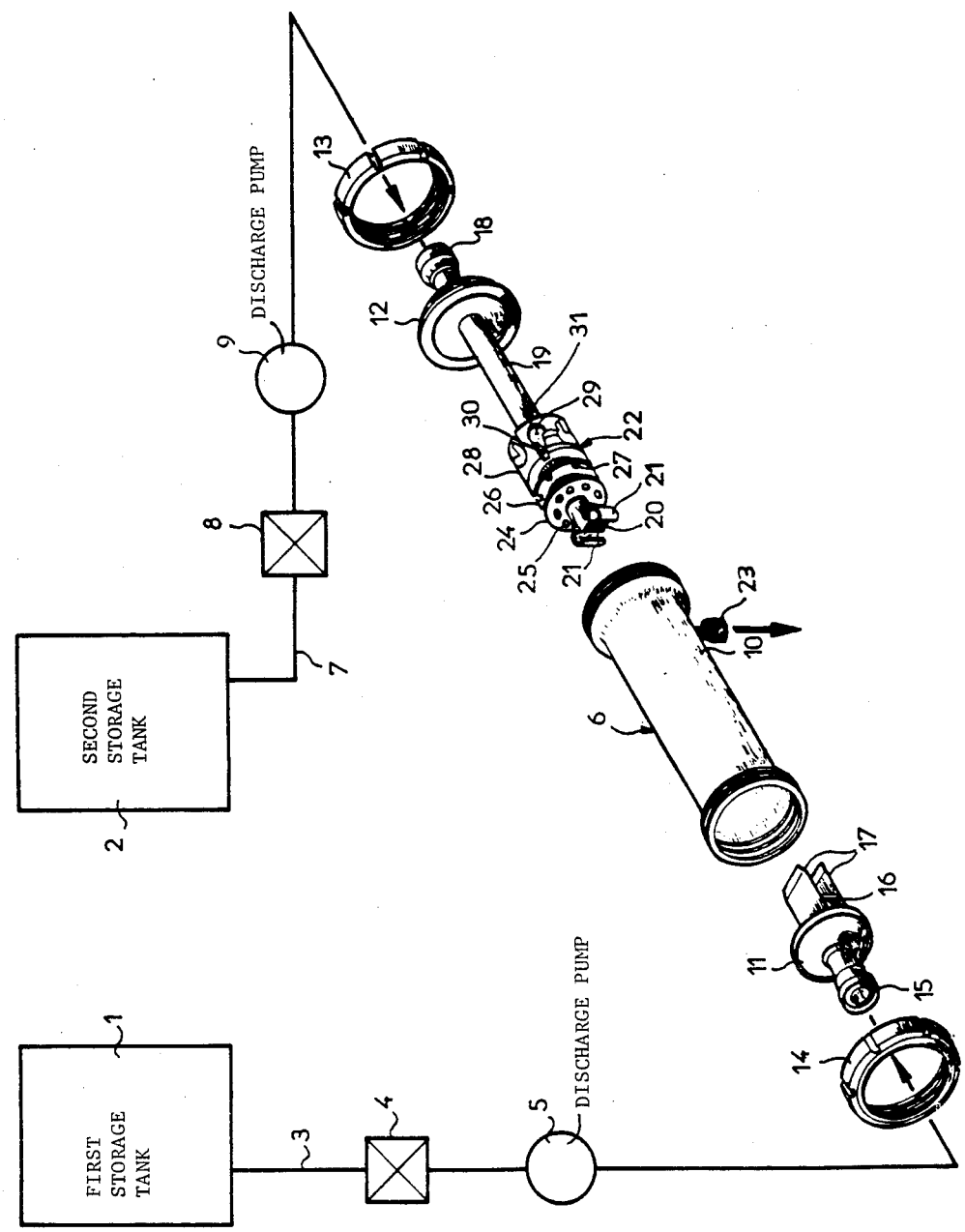

RECONSTRUCTED FRUIT PIECES AND, PROCESS FOR PREPARATION

FIELD OF THE INVENTION

The invention is related to a food product and more particularly to pieces or lumps of reconstructed fruit and to a process for the production of the product.

BACKGROUND OF THE INVENTION

Processes of producing reconstructed fruit have been known for a long time, made from fruit extracts or concentrates to which a gelatinizing substance containing an alginate is added.

The French patent No 2,087,852, for instance, describes pieces of reconstructed fruit made of substantially spherical bodies of a fruit concentrate featuring a gelled skin externally. According to the patent, the skin is made from a gel of a calcium or aluminum alginate or pectate. The French patent No 2,087,852 also covers a process for the processing of such reconstructed food products. According to this process, the first stage is to blend a solution of calcium or aluminum ions to the food; next, drops are formed from this mixed fluid and said drops are brought into contact with a bed of alginate or pectate in order to build said said external jelled skin.

This process does not produce reconstructed fruit that are core gelled and with the same consistence of the natural product. Moreover this process does not permit to add an alcoholic component to the fruit concentrate as alcohol would prevent the formation of the gelled skin.

The French patent No 2,114,706, describes reconstructed fruit which seem to be core gelled in part at least. The production process of reconstructed fruit according to this process basically consists of three stages as follows:

(a) To prepare a Mixture No 1 of alginate or low methoxypectate with a calcium compound that does not contain enough free calcium ions to initiate a gemation, (b) To Mixture No 1, to add the fruit by-product in the presence of a gelling substance, more particularly an acid (malic acid 0.51%, ascorbic acid 0.10%, citric acid:1.20%) The purpose of the acid is to cause the release of the calcium ions from the calcium compound of Mixture No 1 (dicalcic phospahte), (c) To allow the mixture (a)+(b) to gel.

Said patent discloses (on page 3, lines 23 thru 28) that, when mixtures (a) and (b) blend together, the gelation occuring between calcium and alginate ions is so fast that calcium cannot be distributed through the whole alginate mass before a substantial portion of gelation has taken place so that the resulting gel texture is very irregular. To remedy this, the patent proposes to complement the compound with an edible substance that inhibits calcium such as trisodic citrate. But this solution makes necessary to use special care in the preparation of the mixture of $a°$ and $b°$.

Moreover, practical tests have shown that despite the inhibiting substance, calcium and care taken at the mixing stage, the French patent No. 2,114,706 does not permit to obtain reconstructed fruit that is core-gelled uniformously as desired by the User.

SUMMARY OF THE INVENTION

The purpose of the invention is to design the composition and preparation of a food product that is perfectly reconstructed and uniformously core-gelled, permitting the addition of a denaturated fruit alcohol.

The product made according to the invention contains the following approximative proportions, by weight:

Fruit alcohol or denaturated natural alcohol: 1 to 30%
Fruit concentrate: 15–50%
Sugar: 5–30%
Alginate: 0.5–3%

The product according to the invention preferably contains approximately 0.2–2% by weight of a calcium compound such as an anhydrous dicalcic phosphate, in addition.

The fruit concentrate is preferably a fruit pulp or puree. The denaturated fruit alcohol has preferably the same fruit basis as the fruit pulp or puree.

The process according to the invention provides the preparation of a denaturated alcohol with alcohol content from 45° to 55°, the preparation of a first blend containing alcohol, fruit concentrate and a portion of the sugar, the preparation of a second blend containing alginate and the balance of sugar; the latter blend is allowed to de-gas and to rest for about thirty minutes followed by the mixing for both blends in a mixer. In such cases when a calcium compound is used, it is added to the second blend.

According to a preferred form of embodiment, the process of the invention provides for the production, starting from the final mixture, of bodies or uniform dimensions, said bodies being immersed in a solution composed as follows: from 2 to 15% by weight of calcium, 10 to 35% by weight of sugar.

Said bodies are formed by moulding or extrusion according to well-known methods.

The invention also covers a static mixer for the implementation of the process of the invention the major function of which is to ensure a thorough mixing of said first blend supplied from a first storage tank with said second blend supplied from a second storage tank, both blends being supplied to said mixer under a pre-set pressure.

The mixer of the invention includes a cylindrical body closed at both ends by fittings or flanges crossed by the feeding lines of said blends to be mixed; in the vicinity of one of its axial ends, it features a radial discharge fitting, with the input lines going substantially along the full length of the cylindrical body and having injection nozzles at their free ends located in mutual opposition, and the input line for said second blend having in the vicinity of its free end a set of radial deflectors whose the farthest in opposition to the free end of the line is connected with said radial discharge fitting of the cylindrical body.

According to a preferred form of embodiment of the mixer, the free ends of the input lines each have a pair of axial deflectors in opposition, with the pairs of deflectors mutually apart by 90° in order to define a mixing chamber where said nozzles end. The free ends of the deflectors of any said pair of deflectors will be preferably bent toward the longitudinal axis of the corresponding input line.

According to a preferred form of embodiment, said set of baffles includes at least three discs fixed on said input line, with axial spacing; disc No 1 has a series of holes at regular intervals in the vicinity of its outer edge, disc No 2 has a plurality of uniformously spaced radial slots on its outer edge while disc No 3 has a plurality of radial slots each in communication with a radial recess extending opposite the internal end of said discharge fitting.

The mixer according to the invention can be manufactured in a simple and inexpensive way. It provides a first mixing at the level of nozzles and deflectors. The overall homogeneity of this first blending is further improved by processing through said set of baffles. The special configuration of the baffles according to the invention has shown a high efficiency in practice in quite an unexpected manner.

DESCRIPTION OF THE PREFERRED EMBODIMENTS

Several examples of preferred compositions of the product of the invention are listed below:

| Example No 1 | | |
|---|---|---|
| Blend No 1 (fruit) | | |
| apple puree | by weight | 18.00% |
| apricot puree | " | 22.00% |
| crystal sugar | " | 6.15% |
| densified apricot alcohol | " | 3.50% |
| trisodic citrate | " | 0.35% |
| Blend No 2 (alginate) | | |
| sodium alginate | " | 1.00% |
| anhydrous dicalcic phosphate | " | 0.30% |
| crystal sugar | " | 13.70% |
| water | " | 35.00% |

| Example No 2 | | |
|---|---|---|
| Blend No 1 (fruit) | | |
| orange pulp juice | " | 30.00% |
| apple puree | " | 10.00% |
| crystal sugar | " | 6.60% |
| densified whiskey | " | 3.00% |
| trisodic citrate | " | 0.40% |
| Blend No 2 (alginate) | | |
| sodium alginate | " | 1.00% |
| anhydrous dicalcic phosphate | " | 0.35% |
| crystal sugar | " | 13.65% |
| water | " | 35.00% |

| Example No 3 | | |
|---|---|---|
| Blend No 1 (fruit) | | |
| Puree of William pears | by weight | 42.00% |
| Crystal sugar | " | 5.00% |
| densified William pear alcohol | " | 2.50% |
| trisodic citrate | " | 0.30% |
| citric acid | " | 0.20% |
| Blend No 2 (alginate) | | |
| sodium alginate | " | 1.00% |
| anhydrous dicalcic phosphate | " | 0.30% |
| crystal sugar | " | 13.70% |
| water | " | 35.00% |

The one enclosed illustration is an exploded view diagramme of a unit including a static mixer according to the invention for the implementation of the process of the invention.

The unit illustrated includes a first storage tank (1) containing Blend No 1 of the invention, basically composed of a fruit concentrate and a second storage tank (2) containing Blend No 2 of the invention, basically composed of the alginate.

The discharge line (3) of tank (1) is connected through a valve (4) and a discharge pump (5) to one of the inlets of the static mixer of the invention generally identified as (6).

The discharge line (7) of tank (2) is connected to the other input of the mixer (6) through a valve (8) and a discharge pump (9).

The mixer of the invention is shown here as an exploded perspective view; it basically consists of a cylindrical body (1) with both ends open, that can be sealed by two sockets (11, 12) by means of threaded flanges (13, 14).

The socket (11) located on tank (1) side is provided with a fitting (15) whose internal end ends in a nozzle (16) mounted between two longitudinal deflectors (17). The socket (12) located on the side of tank (2) also contains a socket or fitting (18) whose inner end is connected with a tube that substantially crosses the whole length of the mixer body (1) up the the immediate vicinity of the deflectors (17) of the socket (11).

The free end of tube (19) is provided with a nozzle (20) located between two deflectors (21), said deflectors being 90° apart from deflectors (17), of round section. In the immediate vicinity of nozzle (20), tube (19) is provided with a plurality of baffles having the general identification (22). The rear end of the system (22) is located opposite a radial discharge fitting (23) provided on the cylindrical body.

According to the preferred form of embodiment shown here, the system of baffles (22) contains a first disc (24) fixed on tube (19), provided with a plurality of holes (25), a second disc having a plurality of slots (27) arranged in uniform spacing on its periphery, and a third disc with a plurality of recesses. (29). A portion of the recesses open (30) on the radial disc face (28) and another portion with a substantially circular section (31) open to the outer periphery disc face.

In operation, the blends from tanks 1 and 2 are discharged from tanks (1, 2) by means of pumps (5, 9) under a pressure into the mixer, they go through the sockets and are distributed through nozzles (16, 20) respectively.

Owing to the deflectors (17, 21) installed around the nozzles, a first mixing of the products is achieved.

Next, this first blend flows through the baffle system (22) for discharge through the connection (23).

Owing to the special configuration of the baffle system (22) an excellent homogeneity is achieved for the basic two products, viz blend No 1 and blend No 2 according to the invention.

The mixer of the invention has a relatively simple configuration. Cleaning and maintenance are convenient.

Of course, the invention is not restricted to the forms of embodiment described and illustrated here, and many modifications may be made without coming out of the scope of the invention.

We claim:

1. In a food product in form of pieces or lumps of fruit containing a fruit concentrate and a gelling substance, the improvement wherein the weight composition thereof is:
    approximately 1-30% fruit alcohol or denaturated natural alcohol,
    approximately 15-50% fruit concentrate,
    approximately 5-30% sugar, and
    approximately 0.5-3% alginate.

2. A product according to claim 1, which contains more than 0.2-2% by weight approximately of a calcium compound such as an anhydrous dicalcic phosphate.

3. A product according to claim 2, wherein the fruit concentrate is a fruit pulp.

4. A product according to claim 1, wherein the fruit concentrate is a fruit puree.

5. A process for the preparation of a food product in the form of pieces or lumps of fruit containing a fruit concentrate and a gelling substance, wherein the weight composition thereof is:
   approximately 1-30% fruit alcohol or denatured natural alcohol,
   approximately 15-50% fruit concentrate,
   approximately 5-30% sugar, and
   approximately 0.5-3% alginate said process comprising the following steps: preparing a denatured alcohol with alcohol content of approximately 45-55%, preparing a first blend with alcohol, fruit concentrate and a portion of the sugar, preparing a second blend with alginate and the remaining sugar, and deaerating the second blend for approximately 30 minutes and mixing the first and the second blends in a mixing device.

6. A process according to claim 5, wherein the calcium compound to is added to said second blend.

7. A process according to claim 5, further comprising the steps of producing bodies of uniform dimensions from the final mixture and immersing the resulting bodies in a bath containing from approximately 2-15% by weight of calcium and 10-35% by weight of sugar.

8. A process according to claim 7, wherein said bodies are extruded.

9. A process according to claim 7, wherein said bodies are moulded.

* * * * *